United States Patent Office 3,301,809
Patented Jan. 31, 1967

---

3,301,809
N-METHYLOL ACRYLAMIDE-VINYL ACETATE COPOLYMER EMULSIONS CONTAINING POLYVINYL ALCOHOL
Albert I. Goldberg, Berkeley Heights, and Victor Jasinski, South Plainfield, N.J., assignors to National Starch and Chemical Corporation, New York, N.Y., a corporation of Delaware
No Drawing. Filed Apr. 23, 1965, Ser. No. 450,502
12 Claims. (Cl. 260—29.6)

This invention relates to the preparation of novel vinyl acetate copolymer emulsions and to the copolymer emulsions thus prepared. More particularly, this invention relates to the preparation of aqueous emulsions of vinyl acetate:N-methylol acrylamide copolymers.

This application is a continuation-in-part of our copending application Serial No. 97,163, filed March 21, 1961, now abandoned, and assigned to the assignee of the subject application.

It is the object of this invention to prepare useful, stable, aqueous emulsions of vinyl acetate:N-methylol acrylamide copolymers. A further object of this invention involves the use of these copolymer emulsions in the preparation of films which provide excellent adhesive binders capable of extensive crosslinking either upon heating or, when acid catalyzed at ambient temperatures; the resulting crosslinked films being characterized by their rigidity, minimal cold flow, and outstanding resistance to water and organic solvents.

N-methylol acrylamide has long been recognized as a potentially useful vinyl type monomer. The presence of the methylol group provides this monomer with a reactive site which could be utilized for the subsequent crosslinking of any vinyl copolymers which might be prepared from this unique compound. However, attempts to prepare copolymers of N-methylol acrylamide with less reactive vinyl monomers such as vinyl acetate have not been successful since the highly reactive acrylamide double bond in N-methylol acrylamide will ordinarily undergo homopolymerization before any extensive copolymerization with the vinyl acetate can occur. The copolymers resulting from such attempts tend to be heterogeneous in composition yielding very weak, cloudy films which could not be crosslinked efficiently. If such copolymers are prepared in a solvent system their incompatibility is especially evident since, on standing, such solutions soon separate into two distinct phases. As for aqueous emulsion systems of vinyl acetate:N-methylol acrylamide copolymers, the literature appears to be devoid of references to the preparation of these copolymers in this useful form which, as is known, allows the practitioner to avoid the expense and precautions which are necessitated when polymers are prepared in solutions of volatile and/or toxic organic solvents.

We have now discovered a reaction system which enables us to prepare stable, aqueous emulsions of homogeneous vinyl acetate:N-methylol acrylamide copolymers. Moreover, the films derived from these emulsions are clear, free from grits and provide excellent adhesive binders as they are readily crosslinked either upon heating or, when acid catalyzed at ambient temperatures. The resulting crosslinked films are rigid and are not prone to cold flow. In addition, they are particularly outstanding in regard to their resistance to water as well as to a wide variety of organic solvents.

In brief, the process of our invention comprises the emulsion polymerization of an aqueous monomeric mixture of vinyl acetate and N-methylol acrylamide in the presence of a free radical type catalyst; it being essential in our process to make use of polyvinyl alcohol as the main emulsifier or protective colloid. The surprising feature of our invention resides in the fact that vinyl acetate and N-methylol acrylamide, which are both water sensitive as homopolymers, along with the water soluble polyvinyl alcohol are, nonetheless, utilized in the process of our invention so as to result in the preparation of an adhesive binder which possesses water resistance to an exceptionally high degree.

Our vinyl acetate:N-methylol acrylamide copolymers, which for purposes of brevity will hereinafter be referred to as our ViAc:NMA copolymers, will ordinarily be prepared so as to contain from about 84% to about 99%, by weight, of vinyl acetate and from about 16% to about 1%, by weight, of N-methylol acrylamide, although it is preferred that these copolymers should contain from about 6% to about 2% of N-methylol acrylamide. It should also be noted that although the use of minor amounts of other comonomers, such as the acrylates, maleates, fumarates, and various vinyl esters, etc. is not to be excluded from our process, we prefer, however, to restrict ourselves to the exclusive use of vinyl acetate as the comonomer for the N-methylol acrylamide.

In actually preparing these copolymers, the practitioner may employ any of the aqueous emulsion polymerization techniques well known to those skilled in the art. These techniques generally involve the reaction of an aqueous emulsion of the respective monomers in the presence of a free radical type catalyst with the added provision, as necessitated by the process of our invention, that polyvinyl alcohol is employed as the prime, if not the sole, emulsifying agent. Non-volatile buffers or salts are preferably omitted so as to eliminate the presence of any fixed basic salts which would ordinarily retard the crosslinking of the resulting copolymers.

The reaction is usually conducted, under agitation, at reflux temperatures in the range of from about 65° to about 80° C. For best results and for maximum homogeneity of the resulting copolymers, an advisable procedure is the continuous, slow addition of an aqueous solution of the monomeric N-methylol acrylamide to the reaction vessel containing the emulsified vinyl acetate monomer. The reaction is completed when the reflux temperature has exceeded 90° C. In most cases, the reaction will require from about 3 to about 6 hours with the exact time depending upon the particular catalyst and the concentration in which it is used, the reaction temperature, the ratio of the monomers, as well as the particular polymerization technique which is employed. After the polymerization reaction is substantially completed, the product is cooled and, for reasons which will be subsequently explained, its pH may then be adjusted to a level of from about 4 to about 6 by the addition of a volatile base such as ammonia.

As prepared by means of the aforedescribed procedure, our aqueous emulsion ViAc:NMA copolymers should, preferably, have an average particle size of from about 0.5 to about 2.0 microns and a resin solids content of approximately 40% to 60%, by weight. The initial viscosity of these emulsions, as determined, at 25° C. with a Brookfield viscometer using an LVF #3 spindle at 60 r.p.m., should be in the range of from about 500 to about 10,000 centipoise. Moreover, our copolymers should have a medium to high molecular weight as characterized by an intrinsic viscosity, in acetone at 30° C., of at least 0.4.

As polymerization catalysts there may be used one or more of the compounds which are known to act as free radical catalysts. Highly convenient are the organic and inorganic peroxides as well as the inorganic persulfate salts such as ammonium, and potassium persulfate. The catalyst concentration should generally be kept within a range of about 0.1% to about 2.0%, by weight, of the total monomer charge.

With regard to the polyvinyl alcohol emulsifier which, of course, constitutes an essential feature of the novel process of this invention, optimum results are obtained by the use of a low to medium viscosity grade which may be from about 80% to about 90% hydrolyzed. We have found that the viscosity of these emulsifying grades of polyvinyl alcohol is quite critical. Thus, the so-called low viscosity grades of polyvinyl alcohol, which have a viscosity in the range of 4 centipoise, or less, as determined at 20° C. by means of the Hoeppler falling ball method using a 4%, by weight, aqueous solution of the polyvinyl alcohol, have only limited or borderline emulsifying properties. On the other hand, the use of the so-called high viscosity grades of polyvinyl alcohol, which have a Hoeppler viscosity substantially above about 25 centipoise, provides emulsions with rather high viscosities which tend to have limited package stability. We, therefore, use emulsifying grades of polyvinyl alcohol which are from about 80% to about 90% hydrolyzed and which have a viscosity in the range of from about 5 to about 25 centipoise as determined by the Hoeppler method under the above described conditions. Complete details relating to the description and mode of operation of the Hoeppler falling ball viscometer are available from many literature sources such, for example, as on page 88 of Monograph No. 17 which is part of the monograph series published, in 1951, by the Technical Association of the Pulp and Paper Industry.

The overall range for the concentration of polyvinyl alcohol which may be used, in the process of this invention is from about 2 to about 10%, by weight, of the total monomer charge, i.e. the total combined weight of the monomeric vinyl acetate and N-methylol acrylamide. However, within the latter range the precise amount which will be used is a factor which is dependent upon both the viscosity grade of the polyvinyl alcohol being utilized as well as upon the amount of N-methylol acrylamide which is present in the initial monomer charge and which will, therefore, be present in the resulting copolymer. Thus, when one is using a grade of polyvinyl alcohol having a Hoeppler viscosity in the range of from about 15 to about 25 centipoise, it is possible to employ less of the polyvinyl alcohol, e.g. from about 2 to about 6%, by weight, of the monomer charge, and less N-methylol acrylamide, e.g. from about 6 to about 1%, by weight, of the monomer charge, in order to obtain stable copolymer emulsions having the requisite initial viscosity in the range, as noted above, of from about 500 to about 10,000 centipoise, as determined at 25° C. with a Brookfield viscometer using an LVF #3 spindle at 60 r.p.m. The latter conditions result from the fact that these medium viscosity grades of polyvinyl alcohol are superior in their emulsification activity to those grades of polyvinyl alcohol having a lower Hoeppler viscosity in the range of from about 5 to about 15 centipoise. The concentration of N-methylol acrylamide which is required to obtain stable copolymer emulsions having these requisite initial viscosity characteristics may be kept at these lower levels, when using these higher viscosity grades of polyvinyl alcohol, since it has been found that by increasing the concentration of the latter monomer, the stability and initial viscosity of the resulting copolymer emulsion is enhanced in a direct relationship to the amount of N-methylol acrylamide which is present in the resulting copolymer. For these reasons, therefore, the concentration of both the polyvinyl alcohol and of the N-methylol acrylamide may be reduced when using these exceedingly efficient, medium viscosity grades of polyvinyl alcohol as the emulsifiers in our novel process. At the same time, it is of course to be understood that as the concentration of these medium viscosity grades of polyvinyl alcohol which is being used as an emulsifier is increased within a given polymerization recipe, it permits a corresponding decrease in the concentration of N-methylol acrylamide which need be present. On the other hand, using less of these medium viscosity grades of polyvinyl alcohol within a given polymerization recipe permits the use of higher concentrations of the latter comonomer.

Conversely, for these same reasons as given hereinabove, when one is using those viscosity grades of polyvinyl alcohol having a Hoeppler viscosity in the range of from about 5 to 15 centipoise and which are, thus, less efficient emulsifiers, it is necessary to utilize higher concentrations of both the polyvinyl alcohol, e.g. from about 3 to about 10%, by weight, of the monomer charge, and of the N-methylol acrylamide, e.g. from about 16 to about 1%, by weight, of the monomer charge, in order to obtain stable copolymer emulsions having the requisite initial viscosity characteristics. Similarly as noted, hereinabove, with respect to the discussion of the medium viscosity grades of polyvinyl alcohol, it is to be understood that as the concentration of these low viscosity grades of polyvinyl alcohol which is being used as an emulsifier is increased within a given polymerization recipe, it permits a corresponding decrease in the concentration of N-methylol acrylamide which need be present. On the other hand, using less of these low viscosity grades of polyvinyl alcohol within a polymerization recipe permits the use of higher concentrations of the latter comonomer.

The following tables numerically illustrate the above discussed relationships between the viscosity grades of polyvinyl alcohol and the respective concentrations of these emulsifiers and of the N-methylol acrylamide which can be used therewith. It is to be noted, however, that the concentration ranges provided in these tables are merely suggestions to the practitioner and are not to be considered as being in any way limiting upon the process of the subject invention.

TABLE 1.—FOR POLYVINYL ALCOHOL HAVING A HOEPPLER VISCOSITY OF FROM ABOUT 15 TO ABOUT 25 CPS.

| Polyvinyl Alcohol (percent by wt. of monomer charge) | N-methylol Acrylamide (percent by wt. of monomer charge) | Vinyl Acetate (percent by wt. of monomer charge) |
|---|---|---|
| 2.0 | From about 1 to 6 | From about 99 to 94. |
| 3.0 | From about 1 to 5 | From about 99 to 95. |
| 4.0 | From about 1 to 4 | From about 99 to 96. |
| 5.0 | From about 1 to 3 | From about 99 to 97. |
| 6.0 | From about 1 to 2 | From about 99 to 98. |

TABLE 2.—FOR POLYVINYL ALCOHOL HAVING A HOEPPLER VISCOSITY OF FROM ABOUT 5 TO ABOUT 15 CPS.

| Polyvinyl Alcohol (percent by wt. of monomer charge) | N-methylol Acrylamide (percent by wt. of monomer charge) | Vinyl Acetate (percent by wt. of monomer charge) |
|---|---|---|
| 3.0 | From about 1 to 16 | From about 99 to 84. |
| 4.0 | From about 1 to 14 | From about 99 to 86. |
| 5.0 | From about 1 to 12 | From about 99 to 88. |
| 6.0 | From about 1 to 10 | From about 99 to 90. |
| 7.0 | From about 1 to 8 | From about 99 to 92. |
| 8.0 | From about 1 to 6 | From about 99 to 94. |
| 9.0 | From about 1 to 4 | From about 99 to 96. |
| 10.0 | From about 1 to 2 | From about 99 to 98. |

In concluding this discussion relating to the concentration of polyvinyl alcohol, it may be noted that one may use any amount of polyvinyl alcohol within the above stated overall range of from about 2 to about 10%, by weight, of the monomer charge, which, in light of the above described relationships between the viscosity of the polyvinyl alcohol and the concentration of both the polyvinyl alcohol and the N-methylol acrylamide, will result in a stable copolymer emulsion having an initial Brookfield viscosity in the range of from about 500 to about 10,000 centipoise. The selection of the concentration of polyvinyl alcohol which is to be used will thus become a matter of simple experimentation on the part of the practitioner in his efforts to obtain emulsions having any desired characteristics.

The use of polyvinyl alcohol of the type which falls within the above described specifications contributes towards a reduction of the initial and final viscosity of the resulting copolymer emulsion which is otherwise quite viscous and sometimes pasty in its consistency. By thus decreasing the viscosity of the elumsion, its overall stability and useful life are extended since the viscosity of these emulsions ordinarily tends to increase with time. Another factor which aids in decreasing the viscosity changes in our emulsions is the previously noted technique comprising the addition of a volatile base to the freshly prepared emulsion so as to raise its pH to a level in the range of from about 4 to about 6. In addition to ammonia, other volatile bases including morpholine, dimethyl amino ethanol and triethyl amine may also be employed. Emulsions treated in this manner have been found to have a minimum useful life time of up to six months or more.

Films may be cast from our ViAc:NMA copolymer emulsions and, as has been noted, these films are capable of extensive crosslinking either when heated or, when acid catalyzed at ambient temperatures. Thus, when a typical film is heated for about 15 minutes at a temperature of about 130° C., it will crosslink to the extent of about 75-95%, or more, as measured by extracting the soluble portion in boiling acetone. Among the acid catalysts which may be used to effect crosslinking at ambient temperatures are all types of both organic acids such as oxalic, succinic and citric acids, etc. and mineral, i.e. inorganic acids, such as phosphoric acid, etc., and, preferably acidic ammonium salts such as ammonium chloride, ammonium para-toluene sulfonate, ammonium dihydrogen phosphate, and ammonium nitrate. In employing these acid catalysts, they may be incorporated in the emulsion in amounts of from about 0.5% to about 5.0%, as based upon the total weight of copolymer resin solids. As has been noted, the use of acidic ammonium salts is preferred since when these materials are employed as catalysts the resulting formulations have greater stability than is obtained when free acids are used.

In describing the degree of crosslinking or the "tightness" of the cure, we have found it convenient to measure this factor by a term which we designate as the $q$ value. The $q$ value is defined as the ratio of swollen to unswollen volume of a film after its immersion in a solvent. The precise procedure for determining the $q$ value will be described in a subsequent example. Theoretically, the $q$ value is directly proportional to the molecular weight between crosslinks and inversely proportional to the crosslink density. This relationship is quite complex and is dependent upon many variables. For this reason we prefer to employ the $q$ value as a measure of crosslink density in a manner analogous to the use of intrinsic viscosity as a measure of the molecular weight of linear, uncrosslinked polymers. We have found that for satisfactory performance, the $q$ value of our crosslinked copolymers, as determined in acetone at 25° C., should not exceed the value of 8. Beyond this suggested maximum $q$ value, the resulting crosslinked copolymers are found to have properties which are not characteristic of effectively crosslinked materials. Thus, for example, their water, solvent and creep resistance is markedly diminished.

The crosslinked films derived from our ViAc:NMA aqueous emulsion copolymers have excellent structural characteristics, being very rigid and displaying a minimum degree of cold flow or creep. Their resistance to solvents and particularly to water is outstanding. These properties allow the practitioner to employ our self-reactive copolymers as adhesive binders in a wide variety of applications. The lower cost and comparable water resistance of our copolymers would, in fact, suggest their use in place of phenolic and resorcinol thermosetting adhesives in the bonding, coating saturation, or lamination of many types of solid substrates such as wood, textiles, and paper as well as in the manufacture of such products as plywood and wood particle board.

The following examples will more clearly illustrate the embodiment of our invention. In these examples all parts given are by weight unless otherwise noted.

EXAMPLE I

This example illustrates the preparation of our ViAc:NMA aqueous copolymer emulsions and also the crosslinking of the films derived from the resulting emulsions.

The following ingredients were introduced into a reaction vessel equipped with a thermometer, reflux condenser, mechanical agitator and slow addition funnel:

| | Parts |
|---|---|
| Vinyl acetate monomer | 94.0 |
| Polyvinyl alcohol (83.5% hydrolyzed, 4% Hoeppler viscosity=9.0 centipoise) | 4.0 |
| Ammonium persulfate | 0.3 |
| Water | 70.0 |

The above described charge was stirred and brought to reflux at 66° C. After five minutes of continuous refluxing, the slow addition of 6 parts of monomeric N-methylol acrylamide, dissolved in 30 parts of water, was initiated. The addition of this N-methylol acrylamide was completed in two hours whereupon the reflux temperature rose to 78° C. Reflux was then maintained for an additional hour until the temperature of the reaction mass rose to 95° C. thus indicating the substantial completion of the polymerization reaction. The product was cooled and its pH was then adjusted to a level of 5.5 by the addition of concentrated ammonia.

The resulting 94:6 ViAc:NMA copolymer emulsion had a resin solids content of 49.8%, by weight. The average particle size of the resin solids was 1-2 microns. The initial viscosity of the emulsion, as determined at 25° C. with a Brookfield Viscometer using a LVF #3 spindle at 60 r.p.m. was 1500 centipoise. This emulsion displayed excellent stability for well over three months.

Films were readily cast from this emulsion and these were baked for 30 minutes at 130° C. yielding crosslinked films which were 93% insoluble in boiling acetone. These crosslinked films were rigid and displayed no apparent cold flow. They were resistant to a wide variety of organic solvents and displayed outstanding resistance to water.

The $q$ value of these crosslinked films was 3.5. This was determined by a procedure involving the cutting of a 1 square centimeter sample from a sheet of 3 mil thick film and immersing this sample for 3 hours in acetone. The dimensions of this sample are then measured without removing it from the solvent and the $q$ value was calculated by dividing the volume of the swollen sample by that of the original unswollen sample.

To a portion of the above described ViAc:NMA copolymer emulsion we added 3% of ammonium para-toluene sulfonate, as based on the weight of copolymer resin solids. Films were cast from this catalyzed emulsion and after one week at 20° C. the latter were crosslinked to the extent that they were 80% insoluble in boiling acetone. The $q$ value of these crosslinked films, as determined by means of the above described procedure, was 5.3. The properties of these films, in regard to their strength, solvent and water resistance, were all excellent.

Portions of the above described copolymer emulsion, as well as the sample containing the ammonium para-toluene sulfonate catalyst, were employed for the lamination of a variety of porous substrates including wood and paper. The curing cycles utilized were comparable to those described for the crosslinking of the free films derived from these emulsions. The resulting laminates displayed excellent adhesive bonds with no cold flow being evident and with outstanding resistance to water and organic solvents.

EXAMPLE II

This example illustrates the preparation of additional ViAc:NMA copolymer emulsions by means of the process of our invention.

Using the polymerization procedure described in Example I, we prepared ViAc:NMA copolymer emulsions wherein the monomer ratio of the resulting copolymers was varied in each case. These emulsions were all prepared using an 83% hydrolyzed polyvinyl alcohol having a Hoeppler viscosity of 8 centipoise, as determined at 20° C. using a 4% aqueous solution of the polyvinyl alcohol sample. It will be noted that emulsion #5 was prepared with less than our minimum recommended concentration of polyvinyl alcohol while emulsion #6 did not contain any N-methylol acrylamide. All of the resulting emulsions had initial viscosities in the range of from 500 to 10,000 centipoise. Films were prepared from these emulsions and these films were then crosslinked by baking for 30 minutes at 130° C. Additional samples of each of these emulsions were also formulated with 2%, by weight, of ammonium para-toluene sulfonate. Films were cast from these catalyst containing emulsions and these films were crosslinked by one week's exposure at room temperature (i.e. 25° C.). The following table presents data on the composition of each of the copolymer emulsions and on the properties of the crosslinked films which were derived from these emulsions. In this table the designation "percent PVA" indicates the percent of polyvinyl alcohol as based upon the total weight of the monomer charge while the column headed "Water and Solvent Resistance" characterizes these properties for both the baked films and the acid catalyzed films.

| | Monomer Ratio ViAc:NMA | Percent PVA | Percent Resin Emulsion Solids | Films Baked 30 Min. at 130° C. | | Catalyzed Films 1 Week at 20° C. | | Water and Solvent Resistance |
|---|---|---|---|---|---|---|---|---|
| | | | | Percent Acetone Insolubles | q Value | Percent Acetone Insolubles | q Value | |
| #1 | 99:1 | 6 | 56 | 70 | 7.5 | 55 | 8.0 | Good. |
| #2 | 84:16 | 5 | 42 | 98 | 2.0 | 90 | 3.5 | Do. |
| #3 | 90:10 | 3 | 45 | 95 | 2.7 | 82 | 5.0 | Excellent. |
| #4 | 98:2 | 10 | 45 | 85 | 5.5 | 77 | 7.6 | Good. |
| #5 | 95:5 | 1 | 52 | (¹) | | | | |
| #6 | 100:0 | 4 | 55 | 35 | 25.0 | 36 | 28.0 | Poor. |
| #7 | 95:5 | 4 | 53 | 91 | 4.0 | 81 | 6.5 | Very Good. |

¹ Emulsion coagulated.

In the above table it will be noted that emulsion #5, which was prepared with only 1% of polyvinyl alcohol, underwent coagulation and could not be used to prepare films. Emulsion #6, which was a vinyl acetate homopolymer, yielded films which displayed very poor water and solvent resistance. Although the percent acetone insoluble and the $q$ values which were obtained for the acid catalyzed films were not quite comparable to those obtained from the baked films, a continued change in these properties was noticed on further aging of these acid catalyzed films. Thus, in one month these values approximated those of the baked films.

It is interesting to note that emulsion #2, which contained 16% of N-methylol acrylamide, was somewhat borderline in its properties as a result of the high N-methylol acrylamide content of the copolymer. This emulsion was quite pasty, having a viscosity of about 10,000 centipoise at a solids content of 42% and it tended to set-up or gel after six weeks. Furthermore, while the acetone resistance of the films derived from this emulsion was excellent, these films were more water sensitive than the films derived from the other emulsions whose copolymers contained from 2% to 10% of N-methylol acrylamide. For this reason, we generally prefer to remain within the latter range so as to obtain copolymers with optimum properties.

Attempts were also made to prepare similar copolymer emulsions using other well known emulsifiers, including starch, hydroxyethyl cellulose and gum arabic. However, in each case, these attempts were unsuccessful as the resulting emulsions were either gritty or lumpy or coagulated during polymerization.

EXAMPLE III

This example illustrates the use of various grades of polyvinyl alcohol in the process of our invention and demonstrates the criticality of our recommended viscosity range for this emulsifier.

The procedure of Example I was repeated using different samples of polyvinyl alcohol as described below.

A. The use of an 88% hydrolyzed grade of polyvinyl alcohol having a Hoeppler viscosity of 35 centipoise at 4% solids resulted in an emulsion which had properties similar to that of Example I. This emulsion had a viscosity of about 15,000 centipoise at a solids content of 50.2%, by weight. While it performed satisfactorily, it tended to set-up or gel on aging and was unsuitable for use after three weeks.

B. The use of an 88% hydrolyzed grade of polyvinyl alcohol having a Hoeppler viscosity of only 4 centipoise at 4% solids gave very poor emulsifying properties. The particle size of the resulting copolymer averaged 3 to 5 microns and the emulsion settled out after standing for 24 hours.

C. When a sample of polyvinyl alcohol which was 81% hydrolyzed and had a 4% Hoeppler viscosity of 6 centipoise was used, it resulted in an emulsion having a viscosity of 1,000 centipoise at 50.2% solids. This emulsion exhibited good aging properties and was a very satisfactory product.

D. Results comparable to (C) were obtained with a polyvinyl alcohol sample which was 87% hydrolyzed and had a 4% Hoeppler viscosity of 11 centipoise. The resulting emulsion had a viscosity of 3,400 centipoise at 50.0% solids.

EXAMPLE IV

This example specifically illustrates the poor results which are obtained when attempts are made to prepare aqueous ViAc:NMA copolymer emulsions using eight different emulsifiers, other than polyvinyl alcohol, which are often employed in the emulsion polymerization of the homo- and copolymers of vinyl acetate.

In this demonstration, each of the eight emulsifiers was tested by means of a polymerization procedure whereby the following ingredients were introduced into a reaction vessel equipped with a thermometer, reflux condenser, mechanical agitator and slow addition funnel:

| | Parts |
|---|---|
| Vinyl acetate monomer | 94.0 |
| Ammonium persulfate | 0.1 |
| Water | 69.0 |
| Emulsifier (see table hereinbelow) | 4.0 |

The above described charge was stirred and brought to reflux at 66° C. After five minutes of continuous refluxing, the slow addition of 6.0 parts of monomeric N-methylol acrylamide, dissolved in 30 parts of water, was initiated and continued over a two hour period.

Each of the eight runs, utilizing the eight respective emulsifiers therein, was found to have undergone coagulation during the course of the polymerization reaction. The following table lists the various emulsifiers thus tested and gives the length of the reaction period required for the complete coagulation of each run.

| Emulsifier | Time Required to Complete Coagulation |
|---|---|
| Corn starch | 45 minutes. |
| Sodium dioctyl sulfosuccinate | 1 hour and 55 minutes. |
| Sodium lauryl sulfate | 3 hours and 25 minutes. |
| Sodium dodecylbenzene sulfonate | 2 hours and 10 minutes. |
| Mineral oil ($C_{12}$-$C_{18}$ straight chain) sodium sulfonate | 2 hours and 50 minutes. |
| Castor oil sodium sulfate | 40 minutes. |
| Gum arabic | 2 hours and 15 minutes. |
| Hydroxyethyl cellulose | 1 hour and 15 minutes. |

The above data is, therefore, clearly indicative of the fact that conventional emulsifiers are completely inoperative when used in attempts to prepare aqueous emulsion copolymers of vinyl acetate and N-methylol acrylamide. It should be noted that the latter results were obtained under reaction conditions which were essentially identical to those employed for the successful polymerizations, as described hereinabove in Examples I–III, wherein polyvinyl alcohol having the required characteristics was, in each case, employed as the emulsifier.

EXAMPLE V

This example illustrates the use of additional grades of polyvinyl alcohol in the process of our invention and again demonstrates the criticality of our recommended viscosity range for this emulsifier.

*Part 1*

The following ingredients were introduced into a reaction vessel equipped with a thermometer, reflux condenser, mechanical agitator and slow addition funnel:

| | Parts |
|---|---|
| Vinyl acetate monomer | 98.0 |
| Ammonium persulfate | 0.2 |
| Sodium acetate | 0.2 |
| Water | 69.0 |
| Polyvinyl alcohol (88% hydrolyzed, 4% Hoeppler viscosity=25 centipoise) | 3.0 |

The above charge was stirred and brought to reflux at 66° C. After five minutes of continuous refluxing, the slow addition of 2 parts of monomeric N-methylol acrylamide, dissolved in 34 parts of water, was initiated and continued over a period of ninety minutes. Upon the completion of the slow addition period, the charge was heated to 92° C. and maintained at the latter temperature for five minutes whereupon it was cooled to room temperature.

The resulting 98.2 ViAc:NMA aqueous copolymer emulsion was found to be smooth and creamy in its consistency and entirely devoid of grits. It had a resin solids content of 49.7%, by weight and the average particle size of the resin particles was 1.0–2.0 microns. The initial viscosity of the emulsion, as determined at 25° C. with a Brookfield viscometer using an LVF #3 spindle at 60 r.p.m. was 3,500 centipoise. This emulsion displayed excellent stability for well over six months.

*Part 2*

Following the above described polymerization procedure, several additional ViAc:NMA copolymer emulsions were prepared wherein the respective comonomer ratios were varied from that given in Part 1, hereinabove, and where varying concentrations of a number of different viscosity grades of polyvinyl alcohol were utilized.

The following table lists the monomer ratios of the various copolymers which were prepared and describes the viscosity grades and concentration of the polyvinyl alcohol emulsifiers utilized for their respective preparation. Also presented is the initial Brookfield viscosity of the resulting emulsions as determined by means of the procedure described, hereinabove; as well as a description of the stability of these emulsions. It is to be noted that the various polyvinyl alcohol emulsifiers which were used were all 88% hydrolyzed and differed only with respect to their 4% Hoeppler viscosity, as determined at 20° C.

| Monomer Ratio (ViAc:NMA) | 4% Hoeppler Viscosity of Polyvinyl Alc. | Percent Polyvinyl Alcohol on Monomer Charge (by wt.) | Initial Brookfield Viscosity of Emulsion (in centipoise) | Stability of Resulting Emulsion |
|---|---|---|---|---|
| 95:5 | 19 | 3 | 6,000 | Excellent. |
| 98:2 | 19 | 5 | 8,400 | Do. |
| 99:1 | 22 | 6 | 8,600 | Do. |
| 94:6 | 22 | 2 | 3,300 | Do. |
| 97:3 | 24 | 1 | (¹) | |

¹ Coagulated.

Summarizing, the process of our invention is thus seen to provide the practitioner with a means for preparing stable, aqueous emulsions of vinyl acetate:N-methylol acrylamide copolymers capable of yielding films which are readily cross-linked and are useful as adhesive binders in a wide variety of applications. Variations may be made in proportions, procedures and materials without departing from the scope of this invention defined by the following claims.

We claim:

1. The process of preparing stable, aqueous emulsion copolymers of vinyl acetate and N-methylol acrylamide by a reaction which comprises the heating of an aqueous emulsion of a monomer charge consisting exclusively of vinyl acetate and N-methylol acrylamide in the presence of a free radical type catalyst, said aqueous emulsion of monomeric vinyl acetate and N-methylol acrylamide being emulsified with polyvinyl alcohol which is from about 80 to about 90% hydrolyzed and which has a Hoeppler viscosity in the range of from about 5 to about 25 centipoise, as determined with a 4%, by weight, aqueous solution at a temperature of 20° C.

2. The process of claim 1, wherein said monomer charge comprises from about 84 to about 99%, by weight, of vinyl acetate and from about 16 to about 1%, by weight, of N-methylol acrylamide.

3. The process of claim 1, wherein the pH of the resulting vinyl acetate:N-methylol acrylamide copolymer emulsion is adjusted to a level of from about 4 to about 6 by the addition of a volatile base.

4. The process of claim 1, wherein the polyvinyl alcohol is present in said aqueous emulsion of said monomer charge in a concentration of from about 2 to about 10%, by weight of said monomer charge.

5. An aqueous emulsion of a copolymer exclusively of vinyl acetate and N-methylol acrylamide, said emulsion containing, as an emulsifying agent therein, polyvinyl alcohol which is from about 80 to about 90% hydrolyzed and has a Hoeppler viscosity in the range of from about 5 to about 25 centipoise, as determined with a 4%, by weight, aqueous solution at a temperature of 20° C.

6. The aqueous emulsion of claim 5, wherein said vinyl acetate:N-methylol acrylamide copolymer contains from about 16 to about 1%, by weight, of N-methylol acrylamide and from about 84 to about 99%, by weight, of vinyl acetate.

7. The aqueous emulsion of claim 5, wherein said vinyl acetate:N-methylol acrylamide copolymer is present, therein, in a concentration of from about 40 to about 60%, by weight, and said polyvinyl alcohol is present in a concentration of from about 2 to about 10%, by weight of said copolymer resin solids.

8. The aqueous emulsion of claim 5, wherein a volatile base has been added in an amount sufficient to raise the pH of said emulsion to a level in the range of from about 4 to about 6.

9. The aqueous emulsion of claim 6, wherein an acid catalyst has been added in a concentration of from about 0.5 to about 5.0%, as based upon the total weight of the vinyl acetate:N-methylol acrylamide copolymer resin solids which are present in said emulsion.

10. The aqueous emulsion of claim 6, wherein the initial viscosity of said emulsion is from about 500 to about 10,000 centipoise, as determined at 25° C. with a Brookfield viscometer using an LVF #3 spindle at 60 r.p.m.

11. A solid substrate coated with a crosslinked film consisting of a dried residue of an aqueous emulsion of a copolymer consisting exclusively of vinyl acetate and N-methylol acrylamide, said emulsion containing, as an emulsifying agent, polyvinyl alcohol which is from about 80 to about 90% hydrolyzed and which has a Hoeppler viscosity in the range of from about 5 to about 25 centipoise, as determined with a 4%, by weight, aqueous solution at a temperature of 20° C.

12. A laminate comprising at least two solid substrates which are adhesively bound to one another with a crosslinked film consisting of a dried residue of an aqueous emulsion of a copolymer consisting exclusively of vinyl acetate and N-methylol acrylamide, said emulsion containing, as an emulsifying agent, polyvinyl alcohol which is from about 80 to about 90% hydrolyzed and which has a Hoeppler viscosity in the range of from about 5 to about 25 centipoise, as determined with a 4%, by weight, aqueous solution at a temperature of 20° C.

References Cited by the Examiner
UNITED STATES PATENTS 3,081,197  3/1963  Adelman _____ 117—140

MURRAY TILLMAN, *Primary Examiner.*

W. J. BRIGGS, *Assistant Examiner.*